United States Patent [19]
Austin et al.

[11] Patent Number: 5,143,257
[45] Date of Patent: Sep. 1, 1992

[54] SYSTEM FOR PROPORTIONED LIQUID DISPENSING

[75] Inventors: Mickey D. Austin, Duncanville; Richard J. Keller, Mesquite, both of Tex.

[73] Assignee: Kelrus Corp., Mesquite, Tex.

[21] Appl. No.: 621,773

[22] Filed: Dec. 4, 1990

[51] Int. Cl.⁵ .............................................. B67D 5/00
[52] U.S. Cl. .................................. 222/57; 222/129.2; 222/650; 119/72; 137/98; 137/101.21
[58] Field of Search ............... 222/57, 71, 650, 129.2, 222/52; 119/72, 72.5, 74; 137/3, 98, 101.21, 101.31

[56] References Cited

U.S. PATENT DOCUMENTS

| | | | |
|---|---|---|---|
| 3,002,384 | 10/1961 | MacDonald et al. | 73/231 |
| 3,053,087 | 9/1962 | Waugh | 73/231 |
| 3,101,615 | 8/1963 | Pavone | 73/231 |
| 3,301,053 | 1/1967 | Walch, Jr. et al. | 73/231 |
| 3,306,261 | 2/1967 | Purdy | 119/56 |
| 3,437,075 | 4/1969 | Hawes, Jr. et al. | 119/72 |
| 3,455,321 | 7/1969 | Flynn | 222/57 X |
| 3,520,448 | 7/1970 | Russell | 222/57 |
| 3,634,053 | 1/1972 | Klass et al. | 48/195 |
| 3,700,579 | 10/1972 | Clifton et al. | 204/195 P |
| 3,783,248 | 1/1974 | Sugden | 235/92 FL |
| 3,854,894 | 12/1974 | Klass et al. | 48/195 |
| 4,193,515 | 3/1980 | Purdy | 222/57 |
| 4,193,516 | 3/1980 | Purdy | 222/57 |
| 4,276,997 | 7/1981 | Ambler | 222/57 X |
| 4,337,786 | 7/1982 | Myers et al. | 137/3 |
| 4,369,805 | 1/1983 | Tavor | 222/57 X |
| 4,554,939 | 11/1985 | Kern et al. | 137/101.21 X |
| 4,642,222 | 2/1987 | Brazelton | 137/3 X |
| 4,830,220 | 5/1989 | Finnell | 222/57 |

FOREIGN PATENT DOCUMENTS

| | | | |
|---|---|---|---|
| 1097184 | 3/1981 | Canada | 137/101.21 |
| 1498449 | 3/1969 | Fed. Rep. of Germany | 222/57 |
| 1088313 | 10/1967 | United Kingdom | 222/57 |

Primary Examiner—Michael S. Huppert
Assistant Examiner—Anthoula Pomrening
Attorney, Agent, or Firm—Daniel Rubin

[57] ABSTRACT

A system for proportional liquid dispensing of two liquids, the first of which can comprise the main flow drinking water supplied to livestock or poultry and the second of which can comprise controlled quantities of medication or nutrient to be introduced into the drinking water. Comprising the system is a solenoid operated pump for discharging controlled quantities of the second liquid into the main flow. A flow meter emits an electrical signal of the main flow rate at any given time while an optical pressure sensor emits an electrical signal indicative of the static pressure of the main flow. Logic circuits combine the flow rate and pressure signals for varying pump operation to controllably maintain a predetermined mixture ratio of the two liquids.

13 Claims, 5 Drawing Sheets

SYSTEM FOR PROPORTIONED LIQUID DISPENSING

FIELD OF THE INVENTION

The field of art to which the invention relates comprises the art of dispensing medication and or nutrients to the drinking water of livestock and poultry.

BACKGROUND OF THE INVENTION

The growing out of livestock and/or poultry is a major industry. To insure their good health at maturity, the growing-out thereof commonly includes the adding of medication, nutrients or other additives to their food stuff or water supply. In this manner, the livestock and or poultry more readily avoid the common ailments that could otherwise tend to stunt development and or cause premature death.

Not only is such development essential for the commercial well being of the farmer, but good health is also essential for the ultimate consumer to whom the end result represents an edible food product. For these reasons, it has been common industry practice to mix medication and or nutrients such as an antibiotic or vitamins dispensed in controlled dosages to the feed stuff or drinking water supply provided to the various animals. Critical to such a system is the accuracy of control in dispensing the medication and/or nutrient in order to insure adequate doses while avoiding overdoses which could eventually be passed on to the consumer in the ultimate food product with potentially adverse effects.

BACKGROUND OF THE PRIOR ART

Liquid proportioning devices for dispensing medication or nutrients to the drinking water of livestock and poultry are available from a variety of commercial sources. Exemplifying such devices are the disclosures of U.S. Pat. Nos. 4,193,515; 4,193,516 and 4,830,220.

In each of the foregoing patents, the proportioner utilizes a flexible bladder positioned within a tank that provides a concentrate reservoir. Within the tank, water diluent is supplied to portions of the tank surrounding the concentrate reservoir which constitute the diluent reservoir. A mixing chamber is connected to the concentrate reservoir and to the diluent reservoir by an orifice system that is used to meter the liquids in a predetermined ratio. In the '220 patent there is also disclosed apparatus useful when the concentrates contain suspended solids that otherwise could tend to clog the orifices.

Characteristically lacking in devices of the type described is the ability to proportion medication and/or nutrients being dispensed into the water supply with a high order of selected accuracy.

OBJECTS OF THE INVENTION

It is therefore an object of the invention to provide a novel liquid proportioning system for ratio mixing of liquids with unprecedented accuracy.

It is the further object of the invention to effect the previous object with a system that is presettably adjustable to a selected ratio mixture throughout a wide range of operation.

It is a still further object of the invention to utilize the system of the previous objects for the dispensing of medication and/or nutrients into the drinking water supply to livestock and/or poultry.

It is yet a further object of the invention to provide a novel pressure sensing device for use in the system of the previous objects for contributing to the maintained level of accuracy which the system achieves.

SUMMARY OF THE INVENTION

The invention relates to a dispensing system for liquid proportioning a controlled ratio between liquids to be mixed. More specifically, the invention relates to such a system suitable for supplying medication and or nutrients to the drinking water of livestock and poultry that is capable of being selectively preset for maintaining a desired mixing ratio with unprecedented accuracy.

To achieve the foregoing, the system hereof includes a solenoid injection type pump that functions to inject the liquid medication and/or nutrient into the main flow of water. A pressure sensing device connected to the main water flow emits a signal indicative of pressure changes thereat while a water meter emits a signal indicative of flow rate of the main water flow. The combined signals from the water meter and pressure sensor through associated electronics regulate operation of the pump to controllably maintain an accurate mixing ratio sought to be achieved.

Included in the various operating functions of the system is a display of cumulative water totals in the course of flow allowing easy recognition of water consumption during any 24 hour period. It is also operative to indicate water totals during any selective time period required for the grow-out of a poultry flock. A second operating function is to provide injection from a stock solution of liquid medication or nutrient into the main water flow based on a selected ratio to be maintained and controlled through sensing both mainline flow rate and mainline pressure in a manner as to control the rate of injection.

A third operating function is provided in the form of display indicators identifying the mode of operation and current status of the system during use at any point in time. By means of the various operating components, the foregoing can be operated at a selected high level of accuracy, as for example maintaining an injection level of medication into a mainline water flow at the ratio of 1:128. (one ounce of medication per gallon of flow) Any desired change in the selected ratio can conveniently be reset by means of an adjustment setting of a timing potentiometer.

Also included is a novel air ventilation system for disposing of naturally occurring effervescence which occurs in some medications such as Genital Violet and Potassium Chloride, that if left to themselves could result in an erratic supply of stock solution to the pump.

The above noted features and advantages of the invention as well as other superior aspects thereof will be further appreciated by those skilled in the art upon reading the detailed description which follows in conjunction with the drawings.

BRIEF DESCRIPTION OF THE DRAWINGS

FIG. 1-B is a diagrammatic illustration of the system of the liquid proportioning system of the invention as utilized in a direct inline arrangement;

DESCRIPTION OF THE PREFERRED EMBODIMENT

Figure 1A:
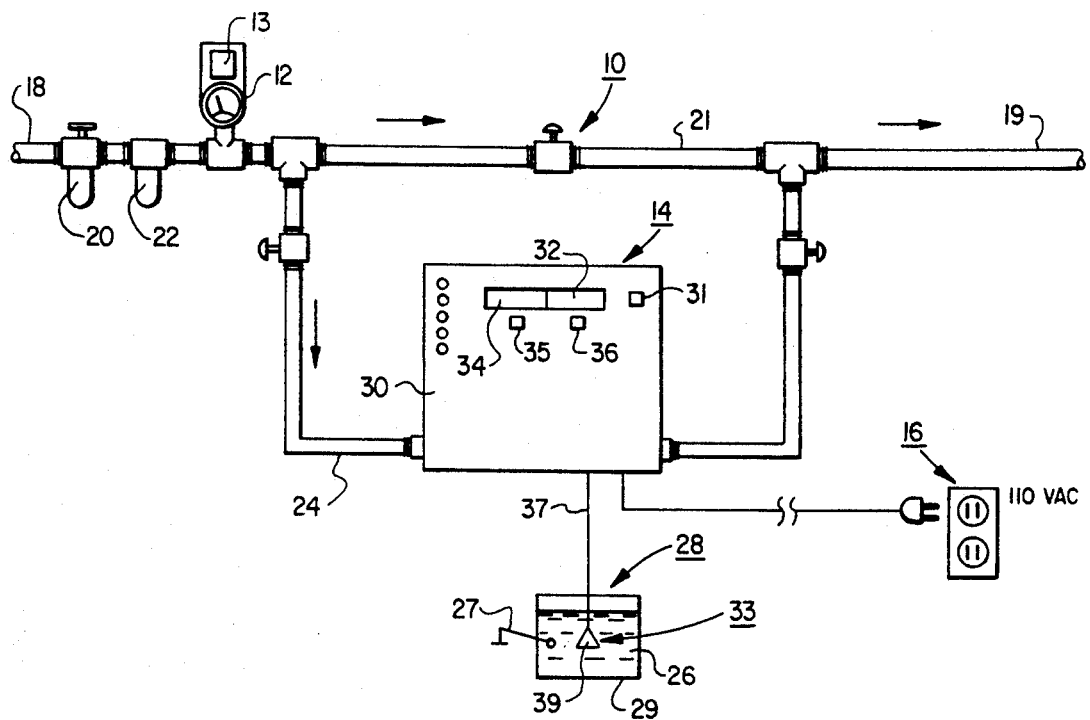
FIG. 1-A is a diagrammatic illustration of the liquid proportioning system of the invention as utilized in a bypass arrangement.

In the description which follows, like parts are marked throughout the specification and drawings with the same reference numerals respectively. The drawing figures are not necessarily to scale and in certain views parts may have been exaggerated for purposes of clarity.

Figure 1B:
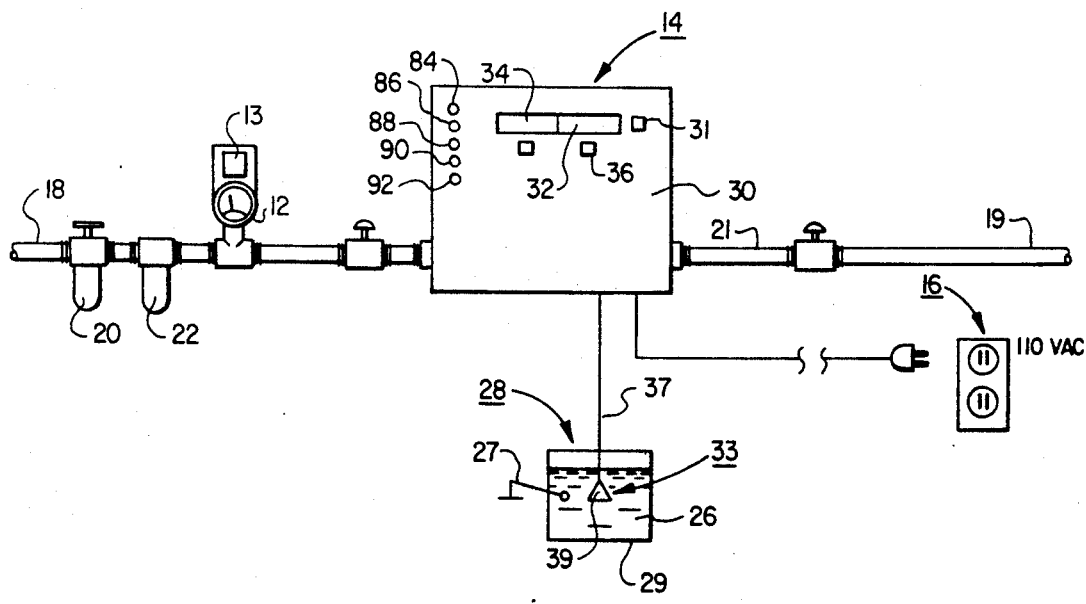

Referring now to the drawings, there is illustrated in FIG. 1-A the system hereof designated 10 including a commercial grade flow meter 12, having a Hall effect switch 13, and a dispenser unit 14 powered from a 110 volt AC source designated 16. Water to the system enters the pipe inlet 18 to flow toward outlet 19 to flow in the direction indicated by the arrows in main line 21 through a pressure regulator 20 and a strainer 22.

In this arrangement, dispensing unit 14 is positioned in a bypass 24 and is supplied with medication/nutrient 26 from a liquid source 28. Comprising source 28 is a reservoir 29 receiving dispensing unit conduit 37 terminating within the reservoir in a conical container 39 of the air ventilation system 33 to be described. The direct line embodiment of FIG. 1-B is similar absent the bypass 24 and its use is optional with the farmer-purchaser.

Water meter 12 is of a type providing an external output signal continuously indicative of the encountered flow rate. In a preferred embodiment, the meter includes a spinning magnet capable of being read by a Hall effect switch 13. Such meters are available from a variety of commercial sources such as the Sentry II water meter from Sensus Technologies of Uniontown, PA.

Comprising dispensing unit 14 is an exterior cabinet 30 in which the various operating components are enclosed. About the front face of the cabinet are windows 32 and 34 for providing water flow data for cumulative or a selected time period and functional signal lights 84,86,88,90 and 92 providing operational status of various operational modes. Specifically, the signal lights include float active 84, prime active 86, medicate active 88, pump active 90 and backflush active 92 as will be understood. Push buttons 31, 35 and 36 respectively afford start, 24 hour flow reset and grow-out reset.

Within cabinet 30 there is included a solenoid actuated reciprocally operative injection pump 38 (FIG. 2) of a type manufactured by Fluid-O-Tech of Italy and available from domestic distributors. The pump when actuated has a normal discharge rate of 0.3 cc per stroke and is able to produce pressures on the order of 110 psig when pumping against conventionally maintained municipal line water pressures. Any pump for this purpose is of course selected to be compatible without damage to internal components for the chemicals with which it is used for the selected applications. Suitable for such use herein in addition to the above, is a pump capable of being controlled by either a timing pulse or by a wave clipping of the power source. A pneumatic piston could be substituted if accompanied by auxiliary equipment enabling it to operate in the manner to be described.

Figure 2:
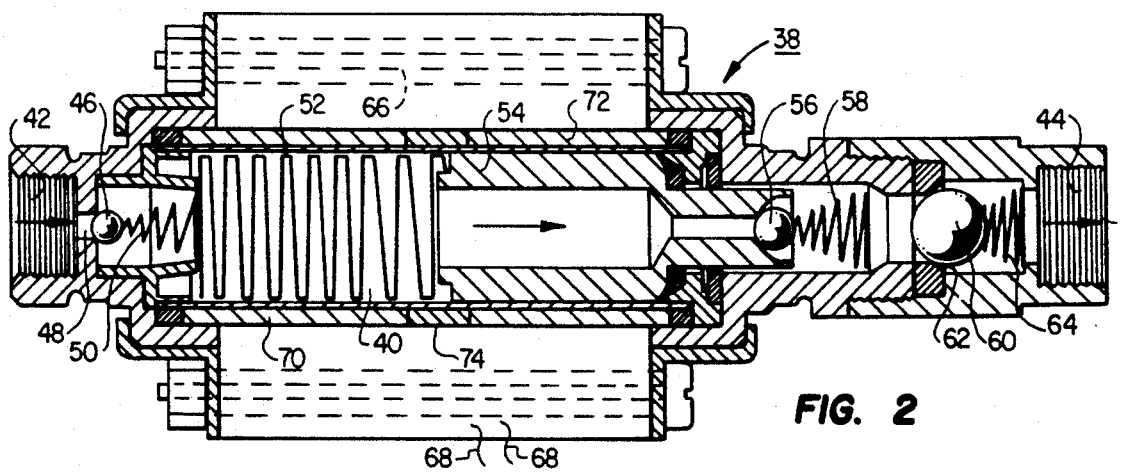
FIG. 2 is longitudinal cross sectional view of the injection pump hereof.

Briefly, pump 38 as shown in FIG. 2 is comprised of a housing defining a central flow passage 40 extending between an inlet 42 and an outlet 44. An inlet check 46 is biased against an inlet aperture 48 via a compressed spring 50 which in turn acts against a compressed spring 52. The latter is positioned in the flow passage at the backside of a reciprocally operable tubular piston 54. At the outlet end of the piston there is provided an internal dynamic ball check 56 biased rearwardly by a compressed spring 58. An exhaust ball check 60 is biased against a seat 62 by means of spring 64.

Figure 3:
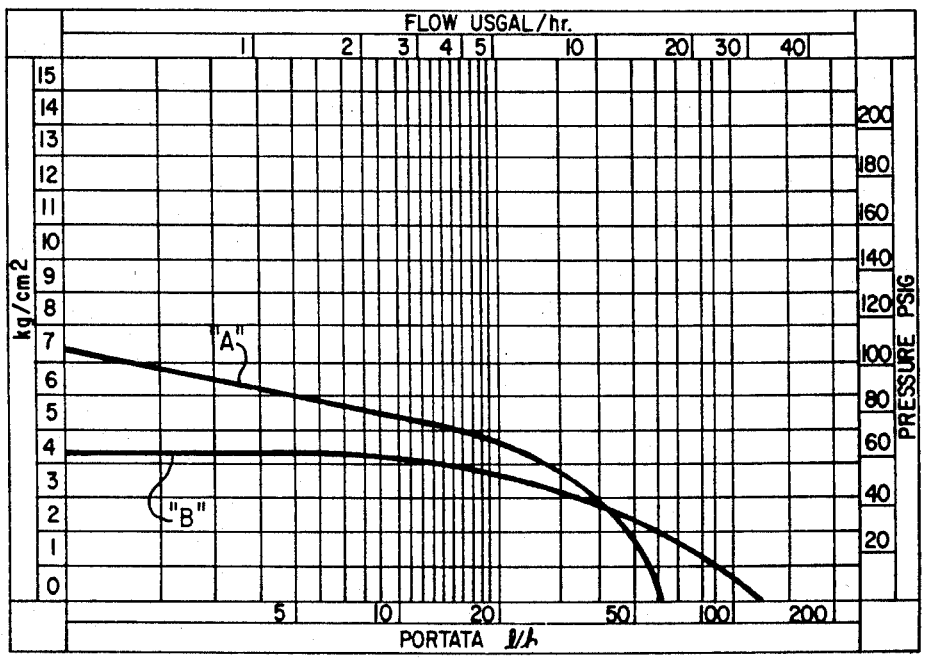
FIG. 3 is a performance curve for the pump of FIG. 2.
Figure 4A:
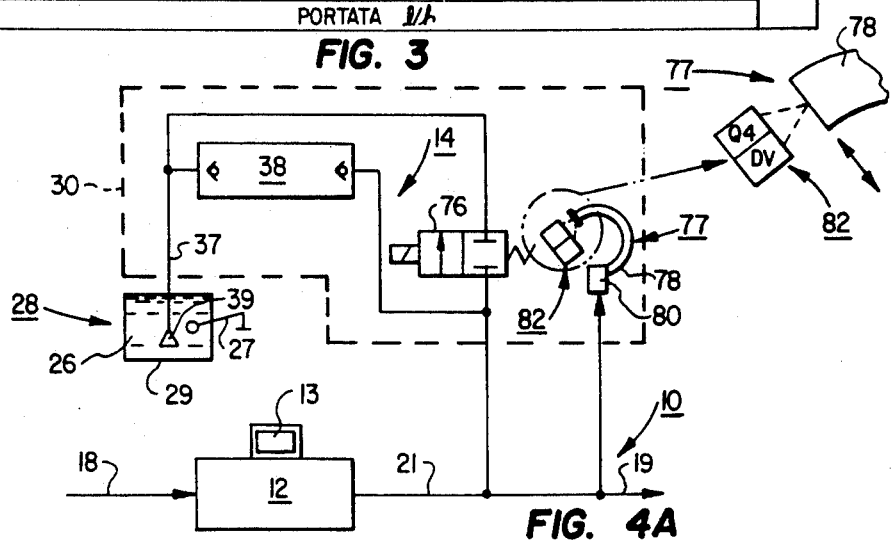
FIGS. 4 A,B,C and D are schematic representations of the various flow modes of the system.
Figure 4B:
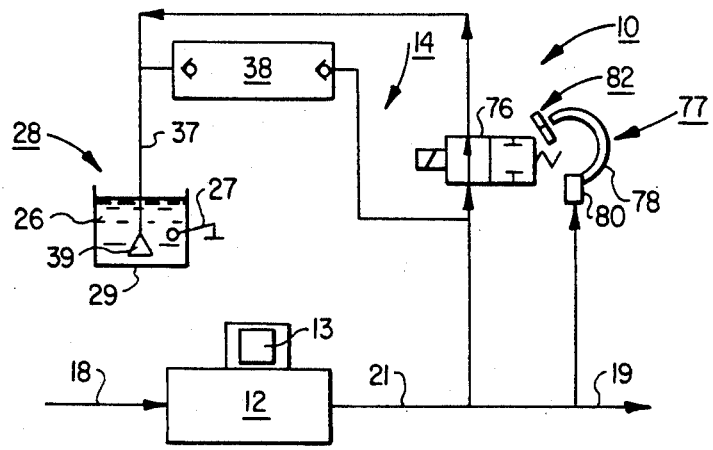
Figure 4C:
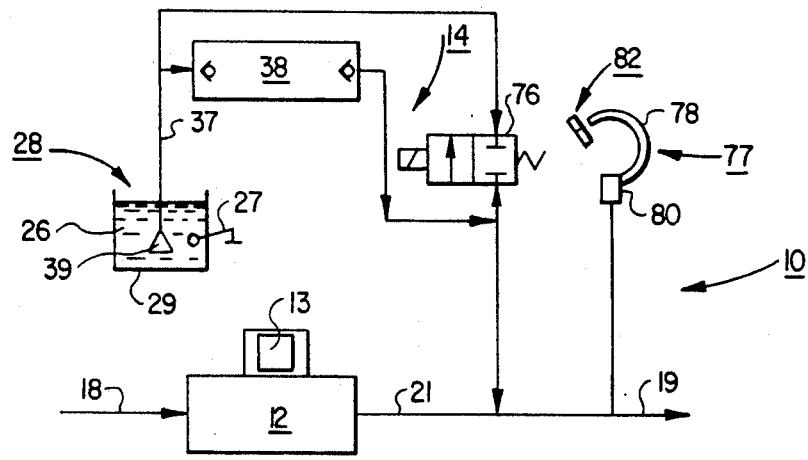
Figure 4D:
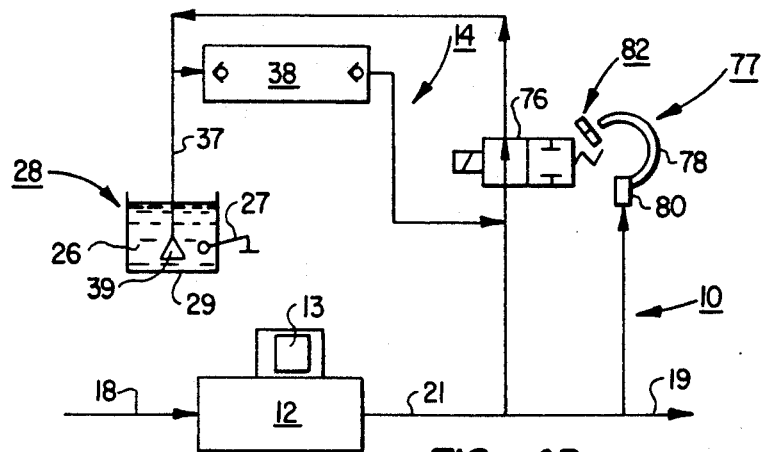
Figure 8:
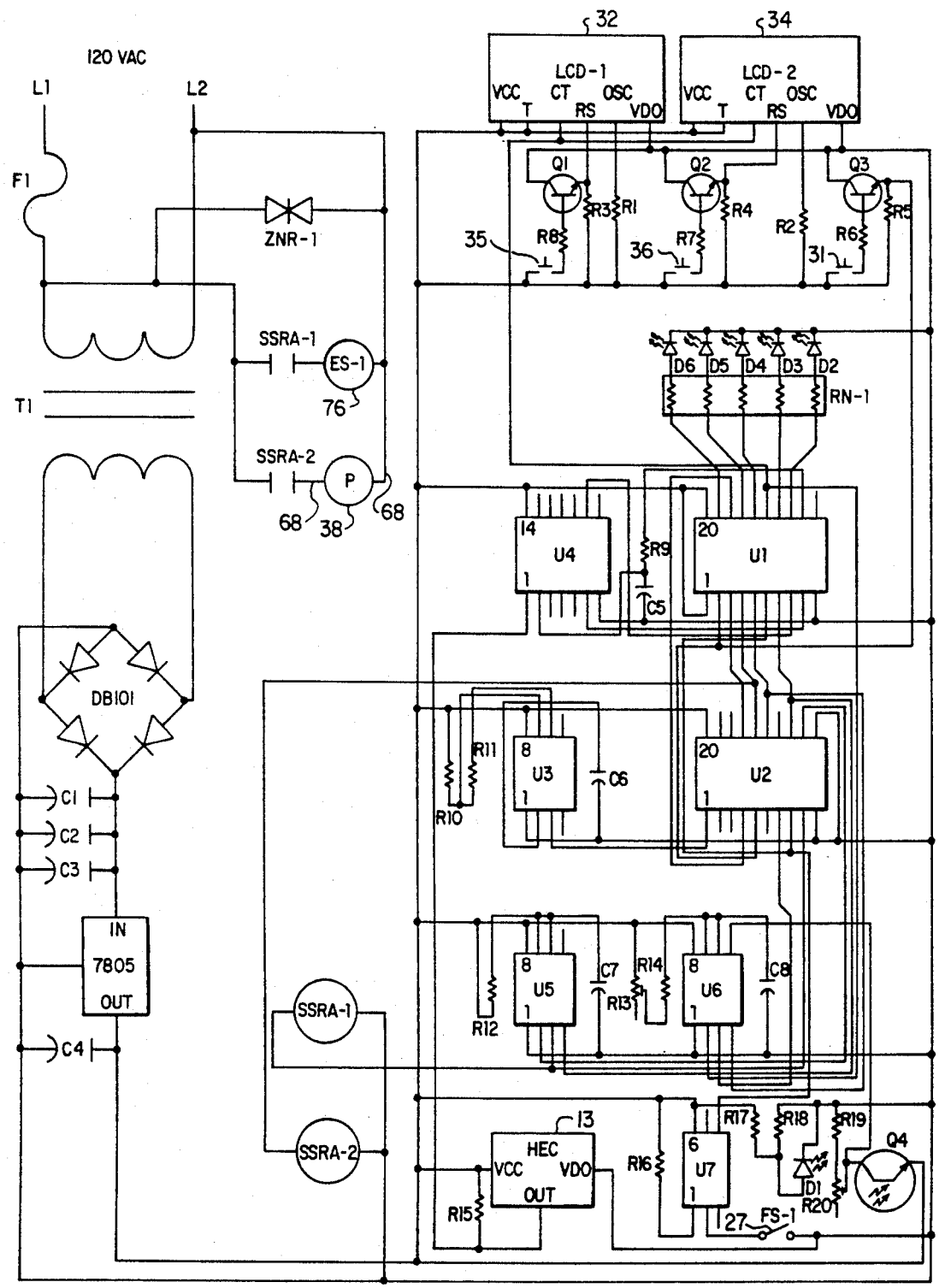
FIG. 8 is a schematic electrical diagram for the system hereof.

Surrounding the pump is an electromagnetic coil 66 controllably energized via leads 68 connected to the circuit illustrated in FIG. 8. Rear core 70 and front core 72 are separated by a core break 74 and surround the piston cylinder in order, when energized and deenergized, to effect reciprocal actuation of piston 54. Performance operation of pump 38 can be understood by reference to the performance chart of FIG. 3 whereby the pump can be operated at an output of about 0.5 gallons per hour at a 100 psig. Curve "A" is indicative of a low pressure version while curve "B" represents the high pressure version utilized herein.

Also contained within cabinet 30 for operation in conjunction with solenoid pump 38 is a solenoid valve 76 (FIGS. 4 A,B,C, & D) connected in a looped arrangement about the pump and a pressure sensing assembly designated 77. The latter includes a Bourdon tube 78 having an inlet socket 80 connected to the main water line 21. Positioned opposite the displacement end is an optical sensor 82 to be described. The basic arrangement of components within cabinet 30 is as illustrated schematically in FIG. 4 A in which cabinet 30 has been outlined in phantom. The flow path for arrangements during the sequentially changing operating cycles, include the prime flow illustrated in FIG. 4B; the medication flow illustrated in 4 C and the backflush flow as illustrated in FIG. 4 D.

Figure 5:
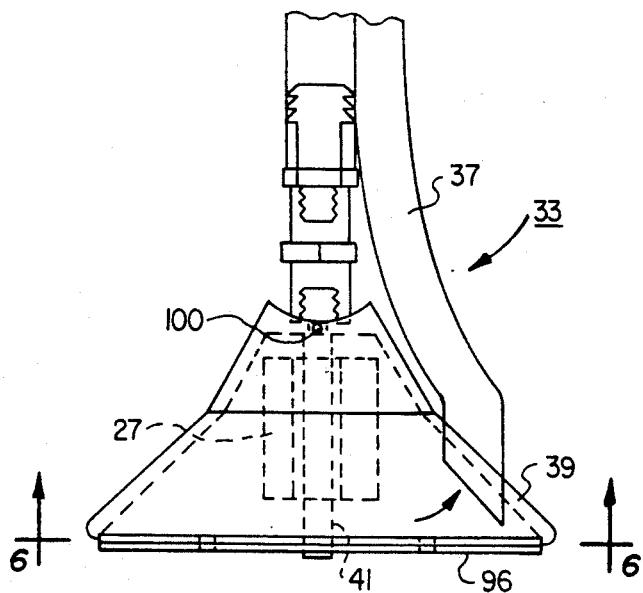
FIG. 5 is an elevation view of the air ventilation device for the medication feed.
Figure 6:
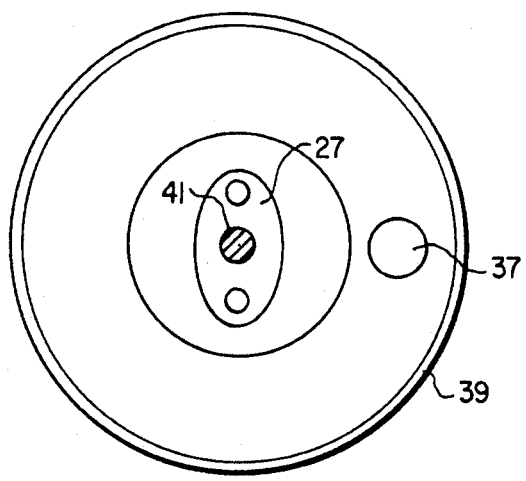
FIG. 6 is a sectional view taken substantially along the lines 6—6 of FIG. 5.
Figure 7:
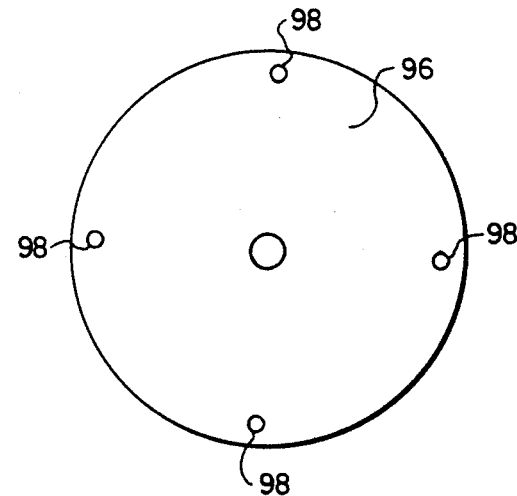
FIG. 7 is a plan view of the intake plate of FIG. 5.

Comprising the air ventilation system 33 of the float assembly 28 as best seen in FIGS. 5,6 and 7, is a conical shell container 39 which houses the float switch 27 on post 41 and the distal open end of medication drop tube 37. The mouth of cone 39 is covered by a metal disc intake plate 96, preferably of brass or stainless steel, with a patterned array of four 0.125 inch intake ports 98. The intake ports are located so as to draw air bubbles generated by the medication in the stock solution 26 away from the medication drop tube 37 and toward the sides of the cone. At that location, the air bubbles are directed by surface tension between the material of the cone toward exhaust ports 100 (one shown) in the top of the cone and through which the air bubbles are eventually released to atmosphere. This prevents accumulation of trapped air around the float switch which could otherwise cause premature dropout of the float and terminate the medication cycle prior to injecting all available medication 26 in the container reservoir 29.

At the same time, a hammer effect caused by the pump turning off on the completion of each pump cycle could cause a back pressure in the float switch chamber. This hammering tends to induce a coriolis force causing any effervescence created in the float switch chamber to be spiraled toward the walls of the chamber where surface tension will likewise cause the bubbles to adhere and eventually be exhausted to atmosphere. It will be appreciated that this system not only prevents damage to the pump, but also ensures high accuracy since any air that is pumped into the main conduit will reduce the amount of medication being pumped by an amount which the air has displaced.

To operate the system 10, as will now be described with reference also to the circuit of FIG. 8, dispensing unit 14 is installed in a main line water flow in the manner of FIG. 1 A or 1 B and the unit is connected to a 120 vac power outlet 16 that is spiked-protected by means of a metal-oxide varistor ZNR-1. The power is transformed thru a 120/6.3 vac transformer T1 and rectified by an integrated circuit bridge DB101. The rectified 6.0 vdc is filtered thru three capacitors C1, C2, C3 and fed into a 7805 type 5 vdc voltage regulator 94. This 5 vdc power is further filtered by means of a capacitor C4 and supplies all necessary voltage and current for the operation of both logic and sensing devices in the system, as will be understood.

Power is supplied to the Hall effect switch 13 located top center within the housing of the water meter 12. The Hall effect switch senses the rotation of a spinning magnet (not shown) located within the water meter and transmits the pulses thru an ohm biasing resistor R15 to the binary counting chip U4 located on a circuit board (not shown). After the counting chip U4 has counted the proper number of pulses (dependent upon type of water meter used) it emits an output pulse to chip U1. Following reception of this signal by U1 and on the subsequent transition of switch 13 from a high state to a low state, U1 emits a pulsed output to the LCD display/counter modules 32 (LCD-1) and 34 (LCD-2) incrementing their number by one. This process continues to repeat itself incrementing the LCD display/counter modules by one each time and thereby allowing a cummulative total of the water flowing thru the meter to be displayed. The LCD display/counter modules 32, 34, may be reset by pushing the reset buttons 35, 36 on cabinet 30 and associated with the module being reset. Pressing the reset button sends a high signal thru a resistor R6 or R7 activating a transistor Q1 or Q2 configured as a grounded emitter thereby sending a low signal to the LCD display/counter module causing reset to occur. The functions and components associated with each LCD module are identical.

When it is desired to introduce medication, nutrient or other liquid stock 26 into the system, that may for example be vitamins B12, or B6, ferrous sulfate, potassium chloride, citric acid, etc. it is first mixed and placed in the reservoir container 29 which is open to atmosphere. The float assembly 28 consisting of the liquid float sensor 27 (FS-1), the air ventilation system 33 and the medication drop tube 37 are placed to extend below liquid level in reservoir 29.

The injection system is then activated by pressing the start button 31 which sends a high signal to a resistor R8 activating transistor Q3, configured as a grounded emitter, which in turn sends a low signal to pal chip U1. On receipt of this signal, U1 checks the status of the float signal FS-1 from float sensor 27, generated by means of an encapsulated reed switch and floating magnet (not shown). This, in turn, activates the triac opto-isolator U7 by turning on the LED thru a resistor R16. When the LED becomes active the triac output is activated sending a float active signal to both pal chips U1 and U2. Should U1 detect a float active signal at the same time the start signal is active and the unit is not already in the medication mode, then the "run" output of pal chip U1 is latched on. This output reports to pal chip U2 activating the medication and backflush cycles. U2 is clock-controlled by a timing chip U3 configured as an astable multi-vibrator. Two other timing circuits located on the PC board are controlled by separate timing chips U5 and U6 both operating in a monostable mode. The first of these U5 controls the time "on" of the priming system while the second U6 controls the time "on" of the injection pump.

For the priming cycle, pal chip U2 receives a low signal at its start input and on the next transition of the U2 clock from low to high, U2, thru a latching output, outputs a signal which enables the timing chip controlling the prime circuit. At the same time, U2 outputs a trigger signal to the prime timer U5 initiating the timing sequence of the priming circuit. On receipt of the trigger signal by the prime timer U5, the timer outputs a high-level signal activating the priming circuit solid-state relay (SSRA-1) thereby supplying power to the priming solenoid of valve 76 (ES-1). At this time, the function of the start pushbutton 31 is disabled until after the medication and backflush cycles have been completed.

Activation of the priming solenoid 76 (ES-1) allows water to be diverted from the main flow to be introduced into the drop tube 37 (FIG. 4 B) to insure there is water present from the medication container 29 to the pump motor and thereby prevent activation of pump 38 in a dry condition. On completion of the timing interval, the priming timer U5 output changes from high to low turning off the priming solid-state relay SSRA-1 and de-energizing the priming solenoid 76 ES-1 thereby blocking water flow from main 21 into the drop tube 37. At this time the priming cycle is completed.

For the medication cycle, (FIG. 4 C) the priming cycle latching output should be high after the priming timer U5 has completed its timing cycle. At the same time, the float sensor 27 (FS-1) signals that liquid is present in the stock solution reservoir 29. With the next transition of the U5 clock from low to high, U2 is caused to shift into the medication mode. In this mode, the priming cycle latching output is taken low, disabling the priming timer U5, and the medication active output is latched on, enabling the medication timer chip U6.

The pump timing chip U6 and R-C network consist of a capacitor C8, a resistor R14 and a potentiometer R13 which sets the basic timing length for fine adjustment of the timing cycle. A signal from U1, synchronized to the count pulses of the LCD modules 32, 34, is applied to the trigger input of the medication timer U6. The basic timing interval of chip U6 is established by means of the R-C timing network associated with the chip (R13, R14, & C8) and is modified by the output of the pressure-sensing assembly 77. The Hall effect switch 13 serves to increment the LCD counter modules and also provides the trigger pulse which fires the pump timer chip U6.

The pressure-sensing assembly 77 is comprised of a Bourdon tube 78 (FIGS. 4A, B, C, & D) rated at 0-100 psi, an infrared optical sensor transmitter-receiver 82(Q4 & D1) and the resistors R17, R18, & R19. The optical sensor is constructed in such a manner that the angle of transmission of the transmitter and the angle of reception of the receiver is such that convergence is achieved at a distance of about 0.2 inches from the face of the sensor. This distance, while not critcal, is desirable since it is the approximate distance the face of the Bourdon tube will travel over its rated pressure range.

The relationship allows the sensor to receive the widest possible change and yet react in the broadest manner to changes in pressure as indicated by the change or reduction in light received. The end face of the tip of the Bourdon tube 78 is preferably covered with a reflective tape (not shown) to provide constant reflectivity of the infra-red beam from the transmitter D1 to the receiver Q4 thus bypassing variations in the construction of the Bourdon tube. For the embodiment being described, the sensor 82 is located substantially 0.007 inches from and parallel to the face of the Bourdon tube. This location is essential since it establishes the relationship of changing squares which provides linearity to the injection system.

Power is supplied to the anode of the infrared transmitter D1 thru a voltage divider network consisting of resistor R17 to 5 vdc and resistor R18 to ground. The cathode of transmitter D1 is connected to logic ground. Infrared light produced by the transmitter D1 is reflected off of the Bourdon tube end face and collected by the infrared receiver Q4 that is configured as a ground-biased NPN transistor. Thus, the collector is connected to 5 vdc while the emitter is connected to ground thru a resistor R19 and a fine adjustment scaling potentiometer R20 that modifies the timing length based on the voltage level present as reported by sensor 82. In this manner, pressure changes in the main flow line connected to inlet socket 80 will cause the Bourdon tube end face to be linearly displaced in response to pressure changes, in a well known manner. Such displacement is immediately sensed by reflected light onto receiver Q4 that is conducted to pin 4 of chip U6. Voltage at this pin causes the timing duration to alter whereby as the voltage rises, the timing duration increases.

The bias voltage afforded by the R17/R18 network provides a constant current thru the transmitter of 19.4 ma and is constructed of 1% precision components to provide consistency and longevity to the system. The receiver is biased thru the series resistor network to provide the proper scaling for the system. For the embodiment being described, the required range is from 21.6 mv at -0- pressure to 69.7 mv at -80- PSI. This range provides the proper voltage levels to PIN 4 of U6 (voltage control pin) to provide the necessary timing duration to adjust dynamically for changes in pressure. Scaling adjustments are necessary to compensate both for minute differences in the internal piping of the unit and for different sizes of pipe in the field.

The total system of the pressure sensing assembly 77 and the pump timing circuit of U6 and the R-C network are critical to the operation of the pressure-sensing device enabling it to function as a linear modifier into the timing circuit. This is based on the premise that pressure at the Bourdon tube 78 represents the differential between water pressure and atmospheric pressure, which is equal to the square of the rate of flow of the water thru the pipe 21. Also, since light intensity decreases with the square of the distance from its source, there is a proportional relationship of squares between the light of the infrared transmitter D1, Q4 and the pressure detected in the flow pipe. This relationship remains effective even though the source, the infrared receiver Q4 detects, is not the quantity of infrared directly transmitted by D1 but rather the reduced quantity of infrared light reflected by the end face of Bourdon tube 78.

The net result of the above and the translation of their results into electronic format via U6 and the R-C network produces a timing pulse output by the pump timing chip U6 that is continuous and linear for the pressure range and flow conditions involved. This allows the device to maintain highly accurate injections at the selected preset mixing ratio across a broad range of main flow pressures and flow rates. An infinite number of injection ratios could be achieved in this manner by varying the pump timer to produce either a larger or smaller timing pulse. In fact, a whole family of curves for available injection ratios may be achieved by modifying the output of the pressure-sensing device 77.

When the output of the pump timer U6 goes high, that signal is applied to U2. U2 then checks the float input 27 (FS-1) to verify that liquid 26 is still present in the reservoir 29. If both these conditions are met, U2 then outputs a high signal to the pump solid-state relay (SSRA-2) thereby applying power to the injection pump and causing injection of the stock solution 26 into the main water flow 21. The medication cycle ends when the signal 27 (FS-1) goes from high to low at U2. When this event occurs and on the next transition of the U3 clock from low to high, U2 drops the medication latching output and the run latching output of U1.

Interaction of the above therefore includes the Hall effect switch 13 which counts revolutions of the spinning magnet located within the water meter 12 until 0.1 gallons of water have flowed thru the meter. The number of revolutions counted depends on the water meter being used. When 0.1 gallons have passed the meter, the counting chip outputs a signal to U1. U1 receives this signal and waits until the Hall effect switch has gone low again. This wait period allows the counting chip to stabilize and verify a correct count value. If the correct count value is present and the Hall effect switch has gone low then U1 outputs a trigger signal that starts the timing sequence of the pump timing chip U6. At the same time, a reset signal is sent to the counter chip U4 to reset the internal registers of U4 to a 0 condition and allow a new count sequence to begin. This process repeats itself for so long as water flows and power is applied to the system. Consequently, a new pump cycle is initiated after every 0.1 gallons of flow thru the main conduit 21.

During the foregoing, optical sensor 82 detects changes in the operating pressure of the system almost instantly and reports those changes to the pump timing chip U6, pin 4. The voltage present on pin 4 of U6 acts as a modifier to the basic timing length in a manner that as the voltage rises the timing length is increased. This action enables the higher operating pressures of the system to operate the pump longer in order to inject the required amount of chemical 26 into the main flow of the system.

Assuming a static system without water flow and a static pressure of 80 PSI, the Hall effect switch has no revolutions to count and therefore no pump action is required. As demand increases due to increased drinking by a flock of birds, the water meter begins to spin and the Hall effect switch registers the increasing demand. This initiates pump action on each 0.1 gallons of flow. Assuming the flock is composed of one week old birds, the demand for water will be light and consequently the flow rate will remain low (on the order of 0.25 to 1.25 GPM of consumption). Since static pressure in the system decreases as flow rate increases, the pressure at these flow rates will be something less than 80 PSI (typically in the range of about 70 PSI to 75 PSI). Since pressure in the main conduit 21 acts as back pressure on the pump 38, the lower the pressure in the main conduit the greater the net pressure produced by the pump and the greater the amount of chemical 26 that is injected by each stroke of the pump. In order to compensate for these changes in amounts injected by each stroke of the pump, the circuit hereof varies the number of strokes the pump makes on each injection cycle.

As the birds grow older, the demand for water increases. The Hall effect switch senses this increased flow rate by the more rapidly spinning magnet and thus initiates pump cycles with increasing frequency. As the demand increases, the velocity of the water thru the main conduit increases causing the main line pressure to drop even further. At the typical maximum flow rate of a modern poultry house of 16 GPM, the pressure in the main conduit will be only about 18 PSI. This pressure is sensed by the Bourdon tube sensor 82 and reported to pin 4 of U6 as a much lower voltage than that present at the time when the birds were only 1 week old and the flow rates were much lower. This lower voltage on pin 4 of U6 requires the pump timer to be on for a shorter time. This is necessary since the back pressure on the pump is now less and each pump stroke will carry a correspondingly greater amount of chemical 26.

Similarly, sensor 82 will compensate in like manner to pressure changes caused in the source supply to the poultry house since these fluctuations will affect not only the static pressure of the system but also the amount of flow rate available to the system. Consequently, while the separate signals of the Hall effect switch 13 and pressure sensor 82 are independent of each other, once switch 13 indicates on onset of flow they generally have an offsetting effect on controlling pump operation.

Pump cleaning is initiated when the medication latching output goes low and the U3 clock on the next transition goes from low to high. This causes the backflush latching output of U2 to be activated, the priming timer U5 is enabled and the pump clean latching output goes high to initiate the pump clean cycle. When U2 detects that the priming timer U5 has been enabled, it sends a trigger signal starting the timing sequence of the priming timer U5 which in turn sends a high signal to the priming solid-state relay (SSRA-1) turning the relay on and sending power to the priming solenoid 76 (ES-1) causing it to be activated. This once again diverts main water to drop tube 37 at the suction port of the injection pump.

When U2 detects the high signal from the priming timer U5 indicating that the timing sequence has begun, U2 checks the backflush latching output to verify that the system is in the backflush mode. U2 also checks the float signal 27 (FS-1) to verify the presence of liquid in tank 29. (Due to water discharging down the drop tube, the float 27 will quickly be reactivated.) If both conditions are met, U2 outputs a high signal to the pump solid-state relay (SSRA-2) turning that relay on and providing power to injection pump 38. The pump continues to run for the duration of the time allocated by the priming timer (U5). This function serves the purpose of continuously running clean water thru the pump to insure its cleanliness at the conclusion of each medication cycle.

On completion of the pump cleaning cycle, the priming timer U5 signals U2 that the timing cycle is complete and on the next transition of the U3 clock from low to high, U2 turns off its output to the pump solid-state relay (SSRA-2) thereby removing power to the injection pump 38 and turning the pump off. The power to the priming solid-state relay (SSRA-1) is also turned off removing power from the priming solenoid 76 (ES-1) and stopping water discharge through the drop tube 37.

Final backflush is effected as the pump output of U2 goes low. On the next transition of the U3 clock from low to high, the pump clean latching output goes low and the final backflush latching output goes high. This causes another trigger signal to be sent to the priming timer U5 that is still enabled from the previous cycle.

On receipt of the trigger signal, the output of the priming timer U5 goes high turning on the priming solid-state relay (SSRA-1). This energizes the priming solenoid 76 for the final sequence and again diverts main water flow into the drop tube 37 thus serving to flush the drop tube with clean water and alleviate any particulate accumulation.

When the priming timer U5 again signals U2 that the timing sequence has been completed and on the next transition of the U3 clock goes from low to high, the power to the priming solid-state relay (SSRA-1) is removed turning off the priming solenoid 76 and preventing further discharge of water into the drop tube. When U2 detects that it is the final backflush stage and has received a low signal from the priming timer (U5), it momentarily turns on a reset output which insures that all latching outputs have been turned off and the system has completed its series of cycles. Reservoir 29 is then manually changed out or cleaned.

With a pump 38 operative to discharge 0.3 cc per stroke at a rate of 60 strokes per minute, the timing potentiometer is normally set for the circuit to operate the pump a total of 23 strokes. This produces the industry standard injection mixing ratio for poultry of one ounce per gallon giving the desired ratio of 1:128.

A series of five LED indicators 84, 86, 88, 90 and 92 are located in the face of the enclosure 30. These serve as system status indicators to aid the user in determining in which individual cycle the device is currently operating at any point in time. These indicators are controlled by U2 signaling U1 with the status of the float 27, the latching outputs and the injection pump output. The indicators are lighted as follows:

| | |
|---|---|
| Float 84 (D6) | Lighted when float switch 27 detects presence of liquid in the medication stock solution tank. |
| Priming 86 (D5) | Lighted whenever the priming timer is enabled; i.e., initial priming, pump clean final priming. |
| Medication 88 (D4) | Lighted whenever the medication timer is enabled; i.e., during medication cycle only. |
| Pump 90 (D3) | Lighted when logic circuits dictate pump should be on; i.e., during output of pump timer in medication mode or during pump clean in backflush mode. |
| Backflush 92 (D2) | Lighted during backflush mode; i.e., during pump clean or final backfush. |

As identified in the foregoing, the various mentioned electronic elements include:

| ELEMENT | COMPONENT | MFR | PART |
|---|---|---|---|
| SSRA-1, SSRA-2, | Solid State Relay | Allied Electronics | 682-0114 |
| LCD-1, LCD-2(32,34) | LCD counter Display | Digi-Key Electronics | RLC-1000-ND |
| R13 | Timing Potentiometer | | 36C54 |

| ELEMENT | COMPONENT | MFR | PART |
|---|---|---|---|
| R20 | 50K Bourdon Potentiometer 1000 HM | | 36C12 |
| RN-1 | 1K Resistor Network | | Q6102 |
| D2,D3 | LED indicators | | P301 |
| D4,D5,D6 | LED Lenses | | L3000 |
| PB-1,PB-2,PB-3(35,36) | Switches | | P9952 |
| DB101 | Bridge Rectifier | | DB101-ND |
| 7805 | Voltage Regulator | | LM340t-5 |
| C1,C2,C3 | Power Supply Capacitor 1000 uf | | P6231 |
| C4 | Decouple Capacitor .01 uf | | EF2104 |
| C6 | Clock Capacitor .01 uf | | EF2104 |
| C7 | Prime Capacitor 10 uf | | P2013 |
| C8 | Pump Capacitor 15 uf | | P2014 |
| C5 | Reset Capacitor | | EF1473 |
| ZNR-1 | MOV | | P7060 |
| Q1,Q2,Q3 | 2N222 Transistor | | 2N2222 |
| R3,R4,R5 | Resistor | | 10.0KQ |
| R6,R7,R8,R9,R16 | Resistor | | 1.0KQ |
| R10,R11,R15 | Resistor | | 10.0KX |
| R17 | Resistor | | 200X |
| R18 | Resistor | | 18.2KX |
| R19 | Resistor | | 47.5X |
| R14 | Resistor | | 487KX |
| R12 | Resistor | | 587KX |
| R1,R2 | Resistor | | 2.4MQ |
| | Fuse Holder | | FO53-ND |
| F1 | Fuse | | F916-ND |
| D1,Q4 | Optical Sensor | | OR503 |
| HES (13) | Hall effect switch | Honeywell Micro-Switch | SS21PE |
| U1,U2 | Pal Chips | Wylie Labs | PALCE16V-8H25PC |
| U3,U5,U6 | Timing Chip | | TLC555CP |
| U4 | Counter Chip | | MC10424-BCP |
| U7 | Optoisolator | | MOC3010 |

By the above description there is disclosed a novel system and apparatus for dispensing liquids in accurate proportions via a controlled ratio of liquid mixtures. As applicable to the preferred embodiment the system and apparatus hereof effect unprecedented accuracy in supplying medication and or nutrients to the drinking water flow being furnished to livestock and/or poultry. As utilized herein, the system embodies a sequential series of pump cycles including priming, medication supply, pump cleaning and backflush. Not only therefore is medication accurately introduced, by mixing during the medication cycle, but the equipment is per se hygienicly maintained over prolonged operating periods during which the system and apparatus hereof are utilized. By means of a novel optical pressure sensor, changes in main flow line pressure is promptly detected via a reflected light beam which functionally operates the unit for maintaining system accuracy throughout a wide range of pressure fluctuations. In that manner, in combination with flow rate sensitivity, the accuracy by which the equipment is originally set to operate is maintained without the inherent inaccuracies characteristic of the prior art type devices. Yet, where variations in operation are required, system operations can be altered by varying the setting of the timing potentiometer 13 or the scaling potentiometer 20.

Whereas the system and apparatus hereof in the preferred embodiment are primarily intended for use in the poultry and livestock industry with minor changes made to accommodate different injected chemicals, other applications are contemplated. By way of example, the system hereof could be utilized for the chlorine injection of swimming pools; for the liquid fertilization injection into sprinkle systems or garden hoses; for injection of oil for automatic lubrication of industrial machinery; for drip feed systems of liquid nutrients in greenhouses; for controlled mixing of liquid chemical batching processes; etc.

Since many changes could be made in the above construction and many apparently widely different embodiments of this invention could be made without departing from the scope thereof, it is intended that all matter contained in the drawings and specification shall be interpreted as illustrative and not in a limiting sense.

We claim:

1. A dispensing system for proportional mixing of selected liquids comprising:
   a flow meter adapted to be installed in a first conduit containing a flowing source of a first liquid to be mixed, said flow meter being characterized as providing an externally emitted signal correlated to the flow rate being encountered;
   an energizeable pump operably arranged for its discharge to be connected to said first conduit downstream of said meter;
   a second conduit connected to the intake of the said pump for receiving a quantity of a second liquid to be mixed with said first liquid;
   a pressure sensor adapted to sense pressure values of said first liquid in said first conduit and to emit an output signal correlated to changes in the pressure being sensed; and
   control means operable to receive the emitted signals from both said pressure sensor and said flow meter for varying the operation of said pump in controlled correlation to the combined values of said signals.

2. A dispensing system in accordance with claim 1 in which said meter signal is operative to initiate operation of said pump and after pump operation has been initiated said meter signal and said pressure signal are at least partially offsetting with respect to continuing operation of said pump.

3. A dispensing system in accordance with claim 1 in which said control means includes a timing circuit, and said pressure sensor operatively emits a pressure signal effecting linear modification of said timing circuit in correspondence to changes in pressure sensed by said pressure sensor.

4. A dispensing system in accordance with claim 3 in which said pump is reciprocably operable for discharging a predetermined quantity of said second liquid per stroke and said control means is operative to vary the number of pump strokes in correlation to a mixture ratio to be maintained between said first and second liquids.

5. A dispensing system in accordance with claim 4 in which said first liquid comprises water and said second liquid comprises a liquid mixture of predetermined content to be controllably added to said first liquid.

6. A dispensing system in accordance with claim 3 in which said pressure sensor comprises a Bourdon tube having a free end displaceable in a predetermined path in response to pressure changes being sensed and an optical sensor positioned opposite the displacement path of said Bourdon tube for optically sensing displacement thereof and for emitting said pressure signal to said timing circuit in correlation to the measurement of said sensed displacement.

7. A dispensing system in accordance with claim 6 in which said optical sensor comprises a transmitter-receiver for transmitting a light source to an indexed reference location on said Bourdon tube and to receive reflected light from said reference location for emitting said pressure signal.

8. A dispensing system in accordance with claim 7 in which said control means is effective to operate said system in a controlled cycle sequence including priming said pump, discharging said second liquid into said first liquid, cleaning said pump and backflushing said pump.

9. A dispensing system in accordance with claim 7 in which said pump is reciprocably operable for discharging a predetermined quantity of said second liquid per stroke, said system includes a reservoir containing a supply of said second liquid and said second conduit has an intake extending in flow communication with said reservoir for conducting a predetermined quantity of said second liquid to said pump with each operating stroke of said pump.

10. A dispensing system in accordance with claim 9 in which said first liquid comprises drinking water to be supplied to livestock or poultry and said second liquid comprises a health supplement to be supplied to said drinking water.

11. A dispensing system in accordance with claim 9 including air ventilation means associated with the intake of said second conduit for diverting air in said second liquid away from said intake.

12. A dispensing system in accordance with claim 11 in which said air ventilation means includes a float assembly operative for indicating an existing level of said second liquid in said reservoir and said air ventilation means is operatively effective to divert air in said second liquid away from said float assembly.

13. A dispensing system in accordance with claim 12 in which said air ventilation means includes at least one exhaust port through which the diverted air is disposed of.

* * * * *